No. 650,942. Patented June 5, 1900.
E. KREUTZBERG.
MILK COOLER.
(Application filed Sept. 2, 1899.)
(No Model.)
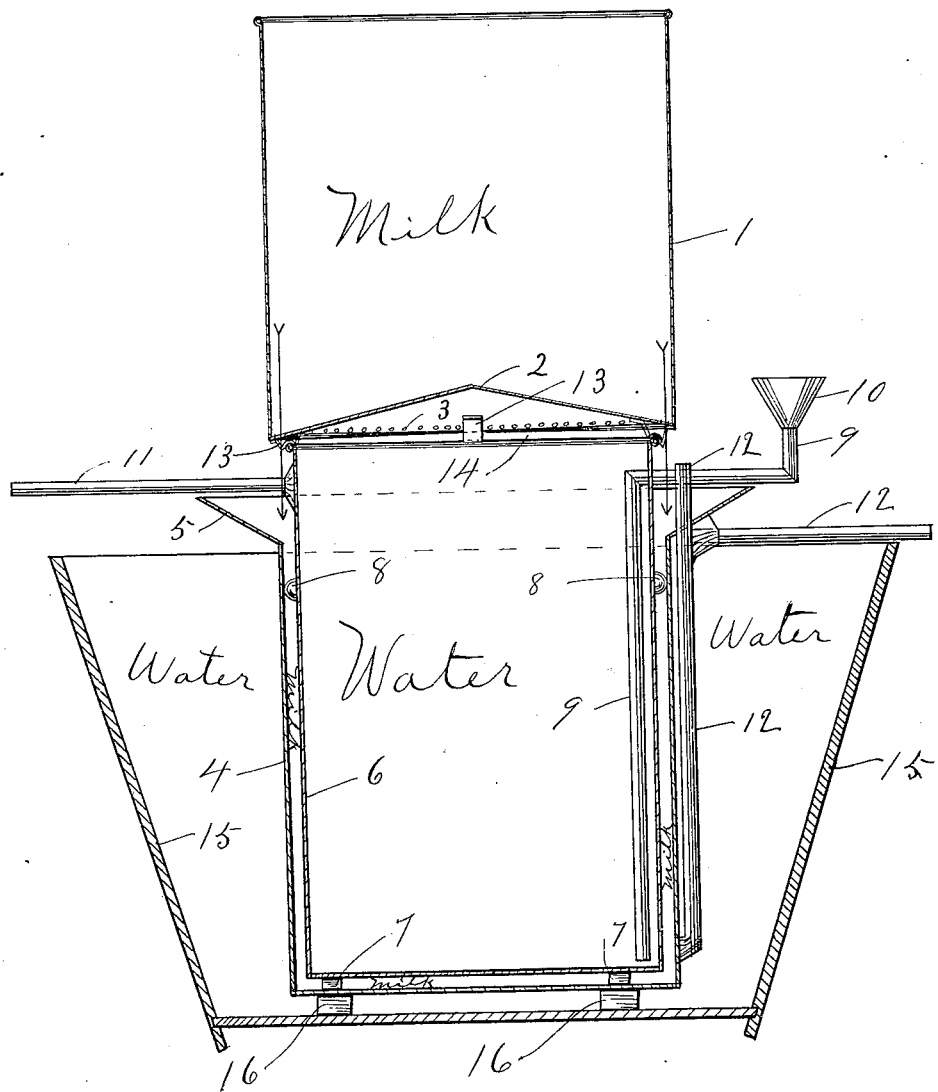
WITNESSES:
INVENTOR:
Ernst Kreutzberg,
BY
Semir G. Wells,
ATTORNEY.
THE NORRIS PETERS CO., PHOTO-LITHO., WASHINGTON, D. C.

UNITED STATES PATENT OFFICE.

ERNST KREUTZBERG, OF MARINE, ILLINOIS, ASSIGNOR OF ONE-HALF TO JOHN H. BRANDES, OF SAME PLACE.

MILK-COOLER.

SPECIFICATION forming part of Letters Patent No. 650,942, dated June 5, 1900.

Application filed September 2, 1899. Serial No. 729,304. (No model.)

*To all whom it may concern:*

Be it known that I, ERNST KREUTZBERG, a citizen of the United States, residing at the city of Marine, Illinois, have invented a new and useful Improvement in Milk-Coolers, of which the following is a specification.

My object is to construct an apparatus which will aerate and cool milk as the milk passes through the device in a continuous stream.

My invention consists of a receiving-tank having a series of small perforations in its bottom, a cooling-tank in position to receive the milk as it passes through the said perforations, a water-tank in the cooling-tank arranged to spread a little milk over a large amount of surface, a receiving-pipe discharging into and near the bottom of the water-tank, a discharge-pipe leading from the top of the water-tank, a second discharge-pipe leading from the bottom of the milk-tank upwardly outside of the said milk-tank and discharging at a level near the top of the milk-tank, and a water-tank to receive the milk-cooling tank.

The figure is a sectional elevation of an apparatus for aerating and cooling milk constructed in accordance with the principles of my invention.

Referring to the drawing in detail, the milk-receiving tank 1 has a concavo-convex bottom 2 with its highest point in the center and a series of small perforations 3 near its periphery. The milk-cooling tank 4 has a flaring upper portion 5 and is in position to receive the milk as it runs through the perforations 3, as indicated by the arrows. The water-tank 6 is placed in the milk-cooling tank 4 and nearly fills the space as required to spread a little milk over a large space. The blocks 7 support the water-tank, and the spacing-lugs 8 keep it in the center of the milk-cooling tank. The receiving-pipe 9 leads from the funnel 10 into and near to the bottom of the water-tank 6, and the discharge-pipe 11 leads from the top of the water-tank 6. The second discharge-pipe 12 leads from the bottom of the milk-cooling tank upwardly outside of the tank through the flaring portion, and a branch 12' leads horizontally from near the top of the milk-tank. The portion of this discharge-pipe which leads upwardly through the flaring portion of the milk-tank is to provide means for cleaning the pipe. The feet 13 upon the bottom of the milk-receiving tank rest upon the upper edge of the water-tank and make a space 14 for the circulation of air under the milk-receiving tank and through and around the streams of milk passing through the perforations 3. The milk-cooling tank is placed in a second water-tank 15 and is supported on the blocks 16.

The milk is placed in the receiving-tank 1 and runs in small streams through the perforations 3 and passes downwardly outside of the water-tank 6 into the milk-cooling tank 4. There is a circulation of cold air under the bottom 2 over the water in the tank 6. Around these pass small streams of milk, and the milk is thereby thoroughly aerated. Cold water is placed in the tank 6 through the pipe 9, and the warm water is carried off through the pipe 11. Cold milk is taken from the bottom of the milk-cooling tank through the pipe 12.

I claim—

1. In a milk-cooler, a milk-receiving tank 1, having a concavo-convex bottom 2 with its highest point in the center, said bottom having a series of small perforations 3 near its periphery; the feet 13 upon the bottom of the said milk-receiving tank; and the water-tank 6 in position to support said feet, thus providing a space for air circulation under said milk-receiving tank so that the streams of milk passing through said perforations pass through and are separated by fresh air, substantially as specified.

2. In a milk-cooler, a milk-receiving tank 1, having a concavo-convex bottom 2 with its highest point in the center, said bottom having a series of small perforations 3 near its periphery; the feet 13 upon the bottom of the said milk-receiving tank; the water-tank 6 in position to support said feet, thus providing a space for air circulation under said milk-receiving tank so that the streams of milk passing through said perforations pass through and are separated by fresh air, the milk-cooling tank 4 containing said water-tank; the flaring portion 5 upon said milk-cooling tank to enlarge its upper end so as to receive from a large circle of said perforations; the water-tank 6 being in said milk-cooling tank and within the circle of said perforations; the receiving-pipe 9 leading into the water-tank; the discharge-pipe 11 leading from the water-tank; the discharge-pipe 12 leading from the bottom of the milk-cooling tank upwardly outside of the tank through the flaring portion of the milk-tank and having a branch leading horizontally from near the top of the milk-tank, the portion of said discharge-pipe which leads upwardly through the flaring portion of the milk-tank being to provide means of clearing the discharge-pipe; substantially as specified.

ERNST KREUTZBERG.

Witnesses:
CLINTON L. CALDWELL,
SEMER G. WELLS.